United States Patent
Gofman et al.

(10) Patent No.: US 12,436,979 B1
(45) Date of Patent: Oct. 7, 2025

(54) COMPUTING SYSTEMS AND METHODS FOR QUERY EXPANSION FOR USE IN INFORMATION RETRIEVAL

(71) Applicant: The Toronto-Dominion Bank, Toronto (CA)

(72) Inventors: Ilan Gofman, Toronto (CA); Jiapeng Wu, Toronto (CA); Jesse Cole Cresswell, Toronto (CA); Guangwei Yu, Toronto (CA); Maksims Volkovs, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/771,197

(22) Filed: Jul. 12, 2024

(51) Int. Cl.
*G06F 16/33* (2025.01)
*G06F 16/332* (2025.01)
*G06F 16/3332* (2025.01)
*G06F 16/334* (2025.01)

(52) U.S. Cl.
CPC ........ *G06F 16/3338* (2019.01); *G06F 16/332* (2019.01); *G06F 16/3344* (2019.01)

(58) Field of Classification Search
None
See application file for complete search history.

(56) References Cited

U.S. PATENT DOCUMENTS

| | | | |
|---|---|---|---|
| 12,164,542 B1 | 12/2024 | Rahman | |
| 12,298,949 B2 | 5/2025 | Arora | |
| 2024/0119257 A1* | 4/2024 | Guo | G06F 16/583 |
| 2024/0256965 A1* | 8/2024 | Chung | G06F 16/33 |
| 2024/0330279 A1* | 10/2024 | Truong | G06F 16/2428 |
| 2024/0362209 A1* | 10/2024 | Almaer | G06F 16/2433 |
| 2024/0428008 A1* | 12/2024 | Abraham | G06F 16/3329 |
| 2025/0028852 A1 | 1/2025 | Chowanski | |
| 2025/0030547 A1 | 1/2025 | Chowanski | |
| 2025/0045316 A1* | 2/2025 | Lee | G06F 16/3344 |
| 2025/0068646 A1 | 2/2025 | Rahman | |
| 2025/0077939 A1 | 3/2025 | Tabatabaei | |
| 2025/0104700 A1 | 3/2025 | Henault-Ethier | |
| 2025/0138838 A1 | 5/2025 | Ramesh | |

(Continued)

OTHER PUBLICATIONS

Bonifacio et al. InPars: Data Augmentation for Information Retrieval using Large Language Models. arxiv.org. Datasheet [online], published Feb. 10, 2022, 15 pages. [retrieved on May 16, 2025]. Retrieved from <https://arxiv.org/abs/2202.05144>.

(Continued)

*Primary Examiner* — Son T Hoang
(74) *Attorney, Agent, or Firm* — Marks & Clerk; Paul Horbal; Jennifer Davy (57) ABSTRACT

A computing system uses a large language model (LLM) to generate one or more synthetic queries for each document of a set of documents. For a user query, the computing system: selects one or more of the synthetic queries related to the user query; generates an adaptive few-shot prompt to instruct the LLM to generate a response to the query, wherein the adaptive few-shot prompt comprises an example query-response pair for each of the selected one more synthetic queries; provides the adaptive few-shot prompt to the LLM as an input; and generates an amended query based on the output of the LLM in response to the adaptive few-shot prompt.

18 Claims, 6 Drawing Sheets

(56) References Cited

U.S. PATENT DOCUMENTS

2025/0139267 A1    5/2025  Zykh
2025/0148276 A1*   5/2025  Csaki ..................... G06F 16/53

OTHER PUBLICATIONS

Wang et al. Query2doc: Query Expansion with Large Language Models. arxiv.org. Datasheet [online], published Oct. 11, 2023, 10 pages. [retrieved on May 16, 2025]. Retrieved from <https://arxiv.org/abs/2303.07678>.

* cited by examiner

COMPUTING SYSTEMS AND METHODS FOR QUERY EXPANSION FOR USE IN INFORMATION RETRIEVAL

TECHNICAL FIELD

The disclosed example embodiments relate to information retrieval and, in particular, to computer-implemented systems and methods for query expansion for use in information retrieval.

BACKGROUND

Information retrieval (IR) is the systematic process of extracting relevant information from a corpus of documents in response to user queries. IR has recently witnessed advancement, particularly with the integration of artificial intelligence (AI) solutions, resulting in the development of new methodologies leveraging neural network-based modules. Among these, zero shot learning for IR has uses when there is no labeled training set. In particular, zero-shot learning enables the system to retrieve documents related to queries, without having been trained on a labeled dataset. Zero-shot learning has particular applications in fields where the nature of queries can be highly variable and/or there may not be relevant labelled training data that is publicly available.

SUMMARY

The following summary is intended to introduce the reader to various aspects of the detailed description, but not to define or delimit any invention.

A first aspect provides a system for performing query expansion, the system comprising: a memory, a communication interface, and a processor operatively coupled to the memory and the communication interface; the processor configured to: for each document of a set of documents, use a large language model (LLM) to generate one or more synthetic queries related to the document; select one or more synthetic queries related to a query; dynamically generate an adaptive few-shot prompt to instruct the LLM to generate a response to the query, wherein the adaptive few-shot prompt comprises an example query-response pair for each of the selected one more synthetic queries; provide the adaptive few-shot prompt to the LLM; and generate an amended query based on an output of the LLM in response to the adaptive few-shot prompt.

Using the LLM to generate a synthetic query related to a document may comprise providing a query few-shot prompt to the LLM that instructs the LLM to generate a synthetic query that is answered by the document, wherein the query few-shot prompt comprises a plurality of example document-query pairs.

Using the LLM to generate one or more synthetic queries for a document may comprise dividing the document into one or more chunks corresponding to portions of text and instructing the LLM to generate a synthetic query for each of the one or more chunks.

The processor may be further configured to, prior to selecting the one or more synthetic queries related to the query, discard any synthetic query that does not satisfy a quality requirement.

The processor may be further configured to, for each synthetic query, determine whether the synthetic query satisfies the quality requirement by using the LLM to determine whether the synthetic query is relevant to the related document.

Using the LLM to determine whether the synthetic query is relevant to the related document may comprise providing the LLM with a relevance few-shot prompt that instructs the LLM to determine whether the synthetic query is relevant to the document, wherein the relevance few-shot prompt comprises one or more examples, each example comprising an example query, an example document or portion of an example document, and an indication of whether the example query is relevant to the example document or portion of the example document.

The processor may be further configured to, for each synthetic query, instruct the LLM to generate a response to the synthetic query from the related document, and determine that the synthetic query does not satisfy the quality requirement if the LLM is unable to generate a response to the synthetic query from the related document.

The query-response for a synthetic query may comprises the synthetic query and the response to the synthetic query generated by the LLM from the related document.

The processor may be further configured to store the synthetic queries in a synthetic query data store in the memory.

The processor may be further configured to assign a similarity score to each synthetic query that represents the similarity between the synthetic query and the query, and the one or more synthetic queries related to the query are selected based on the similarity scores.

The similarity scores may be based on embeddings generated from an embedding model.

The selected one or more synthetic queries related to the query may comprise the k most similar synthetic queries to the query based on the similarity scores, wherein k is an integer greater than or equal to one.

The selected one or more synthetic queries related to the query may comprise each synthetic query that has a similarity score that exceeds a predetermined threshold.

The output of the LLM in response to the adaptive few-shot prompt may be a pseudo document.

Generating an amended query based on the output of the LLM in response to the adaptive few-shot prompt may comprise combining the query and the output of the LLM in response to the adaptive few-shot prompt to form the amended query.

The processor may be further configured to perform an information retrieval task on the set of documents based on the amended query using a zero-shot information retrieval system.

The zero-shot information retrieval system may comprise an embedded model and/or a reranker model, and the processor may be further configured to, prior to performing the information retrieval task, tune the embedded model and/or the reranker model using the synthetic queries and their related documents.

The processor may be further configured to: perform query expansion on the synthetic queries using a plurality of different query expansion methods to generate a plurality of amended synthetic queries for each synthetic query; augment a training set used to train the zero-shot information retrieval system based on the amended synthetic queries; and, prior to performing the information retrieval task, train the zero-shot information retrieval system using the augmented training set.

A second aspect provides method for performing query expansion, the method executed in a computing environment comprising one or more processors, a communication interface, and memory, and the method comprising: for each document of a set of documents, causing a large language model (LLM) to generate one or more synthetic queries related to the document; selecting one or more synthetic queries related to a query; dynamically generating an adaptive few-shot prompt to instruct the LLM to generate a response to the query, wherein the few-shot prompt comprises an example query-response pair for each of the selected one more synthetic queries; providing the adaptive few-shot prompt to the LLM; and generating an amended query based on an output of the LLM in response to the adaptive few-shot prompt.

A third aspect provides a non-transitory computer readable medium storing computer executable instructions which, when executed by at least one computer processor, cause the at least one computer processor to carry out a method for obtaining relevant documents, the method comprising: for each document of a set of documents, instructing a large language model (LLM) to generate one or more synthetic queries related to the document; selecting one or more synthetic queries related to a query; dynamically generating an adaptive few-shot prompt to instruct the LLM to generate a response to the query, wherein the adaptive few-shot prompt comprises an example query-response pair for each of the selected one more synthetic queries; providing the adaptive few-shot prompt to the LLM; and generating an amended query based on an output of the LLM in response to the adaptive few-shot prompt.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

As described above, IR is the systematic process of extracting relevant information from a corpus of documents in response to user queries. With the emergence of large language models (LLMs) and their ability to generate text, techniques have been developed to leverage LLMs to improve IR. One such technique is query expansion in which a query is changed or modified to include relevant information to improve the quality of the query. Query expansion can overcome issues with the original query such as, but not limited to, missing keywords, ambiguity or specificity. By incorporating terms and concepts that did not exist in the original query, query expansion can more clearly capture the meaning and context of the user's request which can result in more relevant documents being retrieved. One query expansion technique known to the Applicant, which is not an admission that it is known in the art or well known, involves using an LLM to generate information (e.g., pseudo-documents) that is relevant to answering an original query. An amended query is then generated by replacing or augmenting the original query with the generated information. The amended query can then be used for IR tasks.

Described herein are computing systems and methods for improved query expansion in which the contents of the corpus of documents in which the IR is to be performed is taken into account. Specifically, in the systems and methods described herein, an LLM is used to generate synthetic queries related to a corpus of documents, and the generated synthetic queries are leveraged in performing query expansion for a user query. Specifically, in some examples, one or more of the synthetic queries related to the user query may be identified; an adaptive few-shot prompt may be generated which instructs an LLM to generate a response to the query, wherein the few-shot prompt comprises example query-response pairs based on the identified synthetic queries; the adaptive few-shot prompt may then be provided to the LLM; and the response of the LLM to the adaptive few-shot prompt is used to generate an amended query. The amended query can then be used for IR applications such as, but not limited to, sparse and dense retrieval. Using the amended queries generated in accordance with the methods and systems described herein in IR tasks may improve the performance of the IR tasks.

Figure 1:
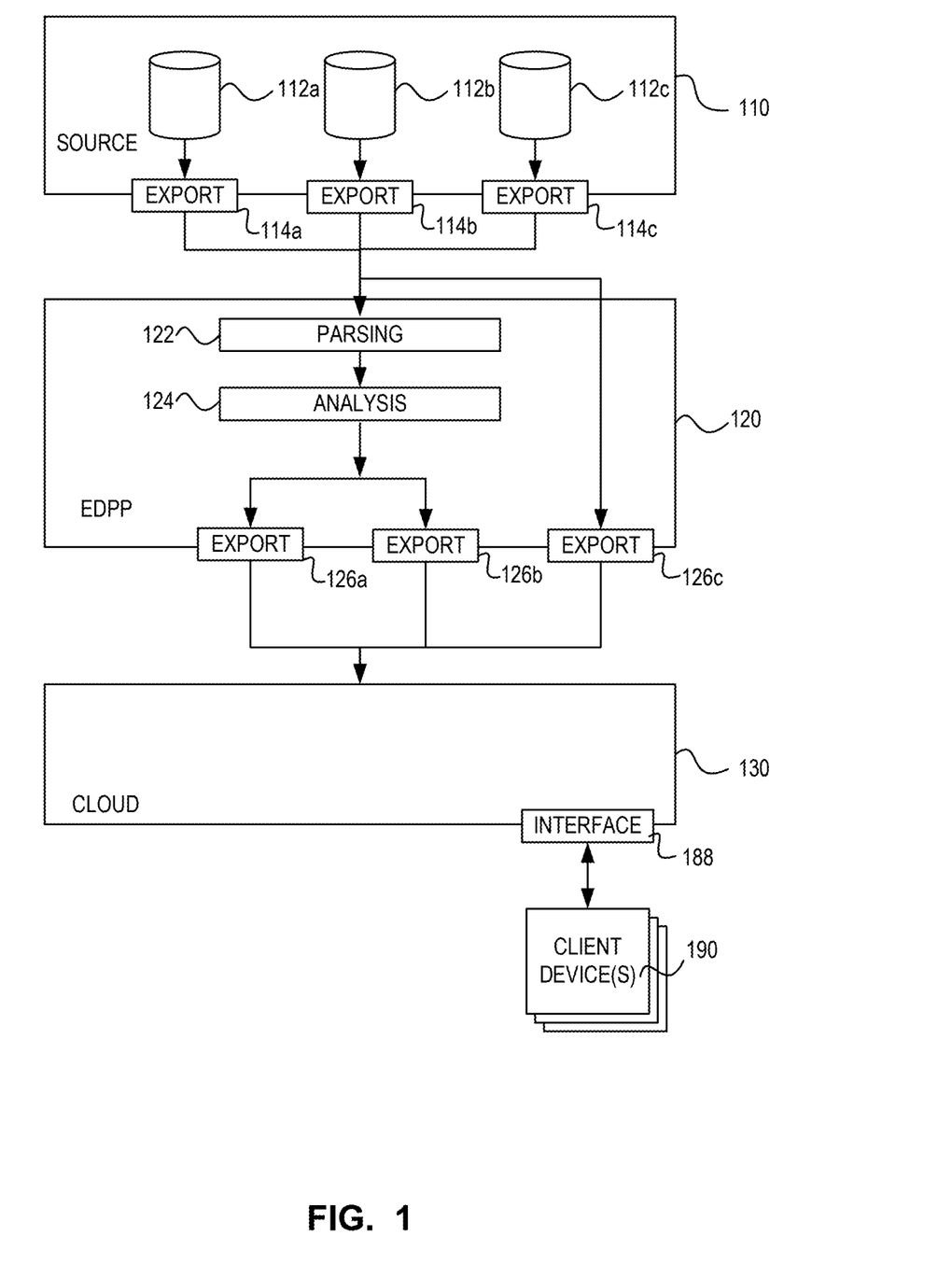
FIG. 1 is a schematic block diagram of an example system for performing query expansion.

Reference is now made to FIG. 1, which illustrates a block diagram of an example computing system 100, in accordance with at least some embodiments. Computing system 100 comprises a source database system 110, an enterprise data provisioning platform (EDPP) 120 operatively coupled to the source database system 110, and a cloud-based computing cluster 130 that is operatively coupled to the EDPP 120. In some cases, this computing system 100 is provided for query expansion, and optionally identifying relevant information from a large set of documents using the expanded query. In some cases, the documents are files that include text. In some cases, different data formats of documents or files (or both), and which include text, can be used in the computing system described herein.

Source database system 110 has one or more databases, of which three are shown for illustrative purposes: database 112a, database 112b and database 112c. One or more the databases of the source database system 110 may contain confidential information that is subject to restrictions on export. One or more export modules 114a, 114b, 114c may periodically (e.g., daily, weekly, monthly, etc.) export data from the databases 112a, 112b, 112c to EDPP 120. In some instances, the data is exported on an ad hoc basis.

EDPP 120 receives source data exported by the export modules 114 of source database system 110, processes it and exports the processed data to an application database within the cloud-based computing cluster 130. For example, a parsing module 122 of EDPP 120 may perform extract, transform and load (ETL) operations on the received source data.

In many environments, access to the EDPP may be restricted to relatively few users, such as administrative users. However, with appropriate access permissions, data relevant to a document or group of documents (e.g., a client document) may be exported via reporting and analysis module 124 or an export module 126. In particular, parsed data can then be processed and transmitted to the cloud-based computing cluster 130 by a reporting and analysis module 124. Alternatively, one or more export modules 126*a*, 126*b*, 126*c* can export the parsed data to the cloud-based computing cluster 130.

In some cases, there may be confidentiality and privacy restrictions imposed by governmental, regulatory, or other entities on the use or distribution of the source data. These restrictions may prohibit confidential data from being transmitted to computing systems that are not "on-premises" or within the exclusive control of an organization, for example, or that are shared among multiple organizations, as is common in a cloud-based environment. In particular, such privacy restrictions may prohibit the confidential data from being transmitted to distributed or cloud-based computing systems, where it can be processed by machine learning systems, without appropriate anonymization or obfuscation of personal identifiable information (PII) in the confidential data. Moreover, such "on-premises" systems typically are designed with access controls to limit access to the data, and thus may not be resourced or otherwise suitable for use in broader dissemination of the data. In some cases, to comply with such restrictions, one or more module of EDPP 120 may "de-risk" data tables that contain confidential data prior to transmission to cloud-based computing cluster 130. In some cases, this de-risking process may obfuscate or mask elements of confidential data, or may exclude certain elements, depending on the specific restrictions applicable to the confidential data. The specific type of obfuscation, masking or other processing is referred to as a "data treatment."

The cloud-based computing cluster 130 includes an interface 188, which facilitates data communication with one or more client devices 190.

In some environments, the EDPP may be omitted.

Figure 2:
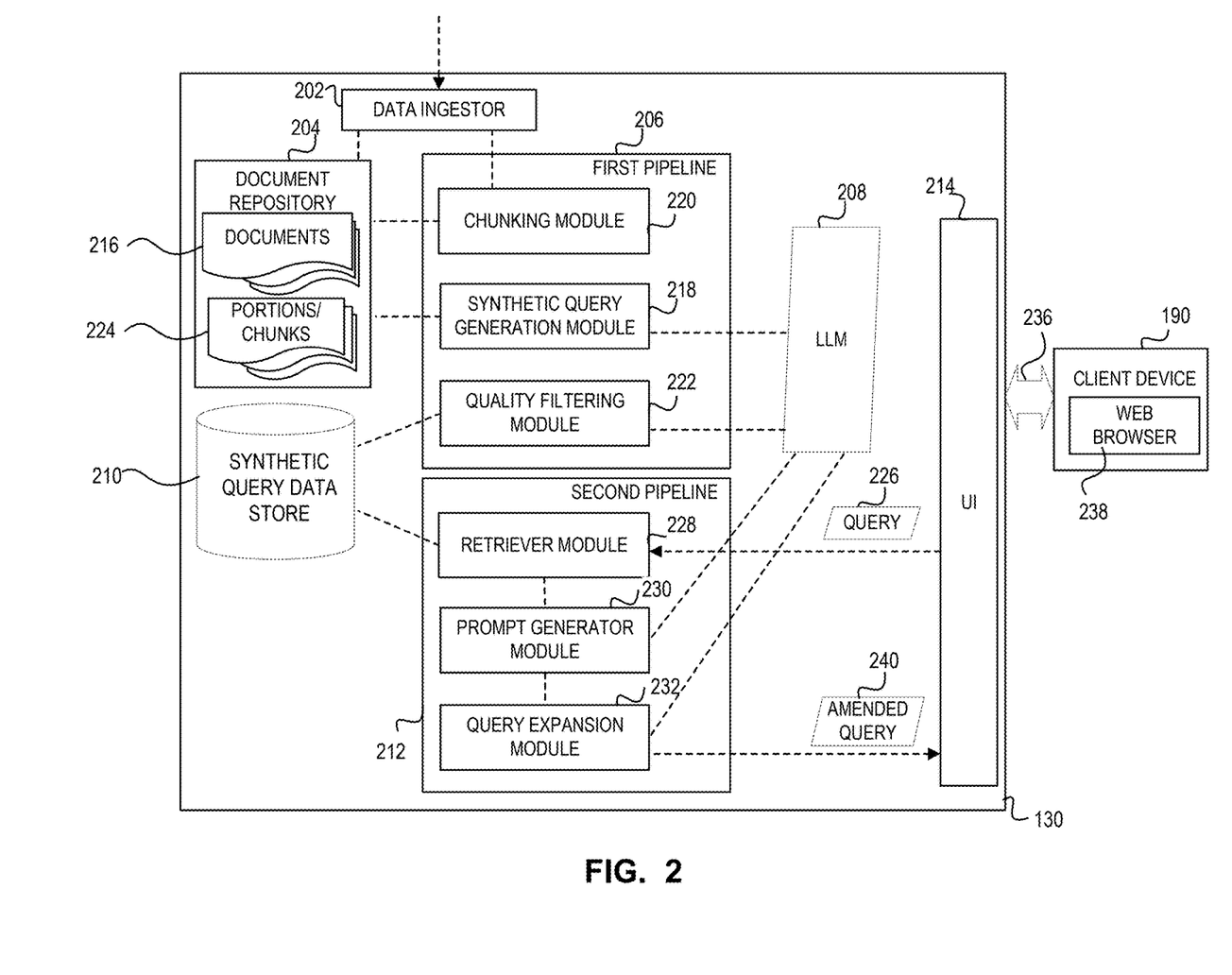
FIG. 2 is a schematic block diagram of an example implementation of the cloud-based computing cluster of FIG. 1 that comprises first and second pipelines for performing query expansion.

Reference is now made to FIG. 2, which illustrates an example implementation of the cloud-based computing cluster 130 of FIG. 1.

The components of the example cloud-based computing cluster 130 include a data ingestor 202, a document repository 204, a first pipeline 206, a large language model 208, a synthetic query data store 210, a second pipeline 212 and a user interface (UI) 214. In some cases, one or more of these components of the cloud-based computing cluster 130 may be implemented by one or more computers within the cloud-based computing cluster. In some cases, one or more of these components may be implemented as virtual machines within the cloud-based computing cluster.

The document repository 204 is configured to store a set of documents 216 The set of documents 216 may be provided to the document repository 204 via the data ingestor 202. In some cases, the set of documents 216 may comprise a corpus of documents on which IR is to be performed.

The first pipeline 206 is configured to generate synthetic queries related to the set of documents 216. The first pipeline 206 may be implemented by one or more computers. The first pipeline 206 comprises a synthetic query generator module 218, and optionally a chunking module 220 and/or a quality filtering module 222. The synthetic query generator module 218 is configured to use the LLM 208 to generate synthetic queries related to the set of documents. In some cases, the synthetic query generator module 218 may be configured to, for each document in the set of documents 216, use the LLM 208 to generate one or more synthetic queries related to the document. A synthetic query may be related to a document if the query can be answered by the content of the document. The synthetic query generator module 218 may be configured to use the LLM 208 to generate a synthetic query related to a document by providing a query few-shot prompt to the LLM 208 that instructs the LLM 208 to generate a synthetic query that is answered by the document, wherein the query few-shot prompt comprises a plurality of example document-query pairs. An example query few-shot prompt is shown below.

Please ask a good and specific question that can be answered with the given document.
Document 1: {{Example Document}}
Query 1 {{Example Query}}
Document 2: {{Example Document}}
Query 2: {{Example Query}}
Now it is your turn:
Document 3: {{Document}}
Query 3:

The query few-shot prompt induces the LLM 208 to generate a query that algins with (e.g., is in the same format and style as) the example document-query pairs. Generally, the higher the quality and more diverse the example document-query pairs, the more likely the LLM 208 will generate relevant and informative queries. Accordingly, a predefined set of example document-question pairs representative of the desired style and format may be used in the query few-shot prompt. The example query few-shot prompt shown above comprises two example document-query pairs, however, this is an example only and that a query few-shot prompt may comprise any number of example document-query pairs.

In some cases, prior to the synthetic query generator module 218 generating synthetic queries related to the set of documents 216, a chunking module 220 may subdivide or partition each document in the set of documents 216 into one or more portions 224, which may be referred to chunks. The portions 224 of the set of documents 216 may be stored in the document repository 204. In some cases, the chunking module 220 may segment the text in a given document into portions of text. In some cases, semantic chunking is used to segment the text. In other cases, document-based chunking is used to segment the text, which identifies and uses a structure of a document—e.g., headers, paragraphs or spaces. Other examples of chunking computations include recursive chunking and fixed-sized chunking. Other currently known and future known chunking computations can be used by the chunking module 220. The chunking module 220 may receive the set of documents 216 from the data ingestor 202 or the chunking module 220 may retrieve the set of documents 216 from the document repository 204.

Where the documents in the set of documents 216 are sub-divided into portions, the synthetic query generator module 218 may use the LLM 208 to generate a synthetic query related to each portion of each document. For example, the synthetic query generator module 218 may instruct the LLM 208 to generate a query related to each portion of each document in accordance with the example document-query pairs. This allows more than one query to be generated for each document. This may increase the range of content covered by the synthetic queries. This is particularly true when one or more of the documents in the set of documents is long and/or encompasses multiple pieces of information.

In some cases, each of the generated synthetic queries is stored in a synthetic query data store 210 for use by the second pipeline 212. In such cases, the synthetic query generator module 218 may be configured to store the generated synthetic queries in the synthetic query data store 210. Each synthetic query may be stored in the synthetic data query data store 210 along with information identifying the related document or related portion/chunk of a document. In other cases, a synthetic query may only be stored in the synthetic query data store 210 after it has been determined, e.g., by a quality filtering module 222, that the synthetic query satisfies a quality requirement. In other words, synthetic queries that do not satisfy the quality requirement may be discarded if they do not satisfy a quality requirement.

In some cases, the quality filtering module 222 may be configured to, for each generated synthetic query, determine whether the synthetic query satisfies the quality requirement by using the LLM 208 to determine whether the synthetic query is relevant to the related document. A synthetic query may be deemed to relevant to the related document if the related document provides an answer or response to the synthetic query. In some cases, the quality filtering module 222 may be configured to determine whether a synthetic query satisfies the quality requirement by providing the LLM 208 with a relevant few-shot prompt that instructs the LLM to determine whether the synthetic query is relevant to the related document, wherein the relevance few-shot prompt comprises one or more examples each of which comprise an example query, an example document or example portion of a document, and an indication of whether the example query is relevant to the example document or the example portion of the document. An example, relevance few-shot prompt which may be used to determine if a synthetic query is relevant to the related document is shown below.

Given a document, please generate "yes" if the document is related to the query and "no" if the document is unrelated.
 Do not generate any other outputs:
 Query: {{Example Query}}
 Document: {{Example Document}}
 Relevant: {{Yes or No}}
 Now it is your turn:
 Query: {{Synthetic Query}}
 Document: {{Document}}
 Relevant:

Due to the inherent limitations of LLMs that mean that generated queries may not always align with the related or corresponding document, evaluating the relevance of the synthetic queries to their related documents in this manner can remove synthetic queries that lack contextual context. This can result in a set of synthetic queries with a demonstrably stronger relevance to their related documents.

In other cases, the quality filtering module 222 may be configured to, for each generated synthetic query, use the LLM 208 to generate a response to the synthetic query from the related document, and determine that the synthetic query does not satisfy the quality requirement if the LLM 208 is unable to generate a response to the synthetic query from the related or corresponding document. In some cases, the quality filtering module 222 may be configured to instruct the LLM 208 to generate a concise response to a synthetic query from its related document by providing the LLM 208 with an extraction prompt that comprises the query, the related document and instructions to generate a response to the query from the related document. An example extraction prompt is provided below.

You are an intelligent assistant. You are given a query and a supporting document, please extract an answer from the document. Be brief in your answers and try to extract the most useful part. Please avoid repeating the question. If the document doesn't contain an answer say "no information".
 Do not mention that the answer is based on the document. Please think step by step.
 Query: {[Synthetic Query}}
 Document: {{Document}}
 Your Answer:

Where the quality filtering module 222 is configured to use the LLM 208 to generate a response to each synthetic query from the corresponding document, the quality filtering module 222 may be configured to store each synthetic query that satisfies the quality requirement in the synthetic query data store 210 together with the corresponding generated response (e.g., synthetic response) for use by the second pipeline 212.

The second pipeline 212 is configured to perform query expansion on a query 226 (e.g., which may be text) received via the user interface 214 using one or more of the synthetic queries generated by the first pipeline 206 (e.g., the synthetic queries stored in the synthetic query data store 210) which have been deemed to be related to the query 226. In some cases, the query 226 is provided by a client device 190 that connects over a data communication link 236 to the user interface 214. For example, a user may input a query 226 via a web browser 238 or some other application that operates on the client device 190.

Figure 3:
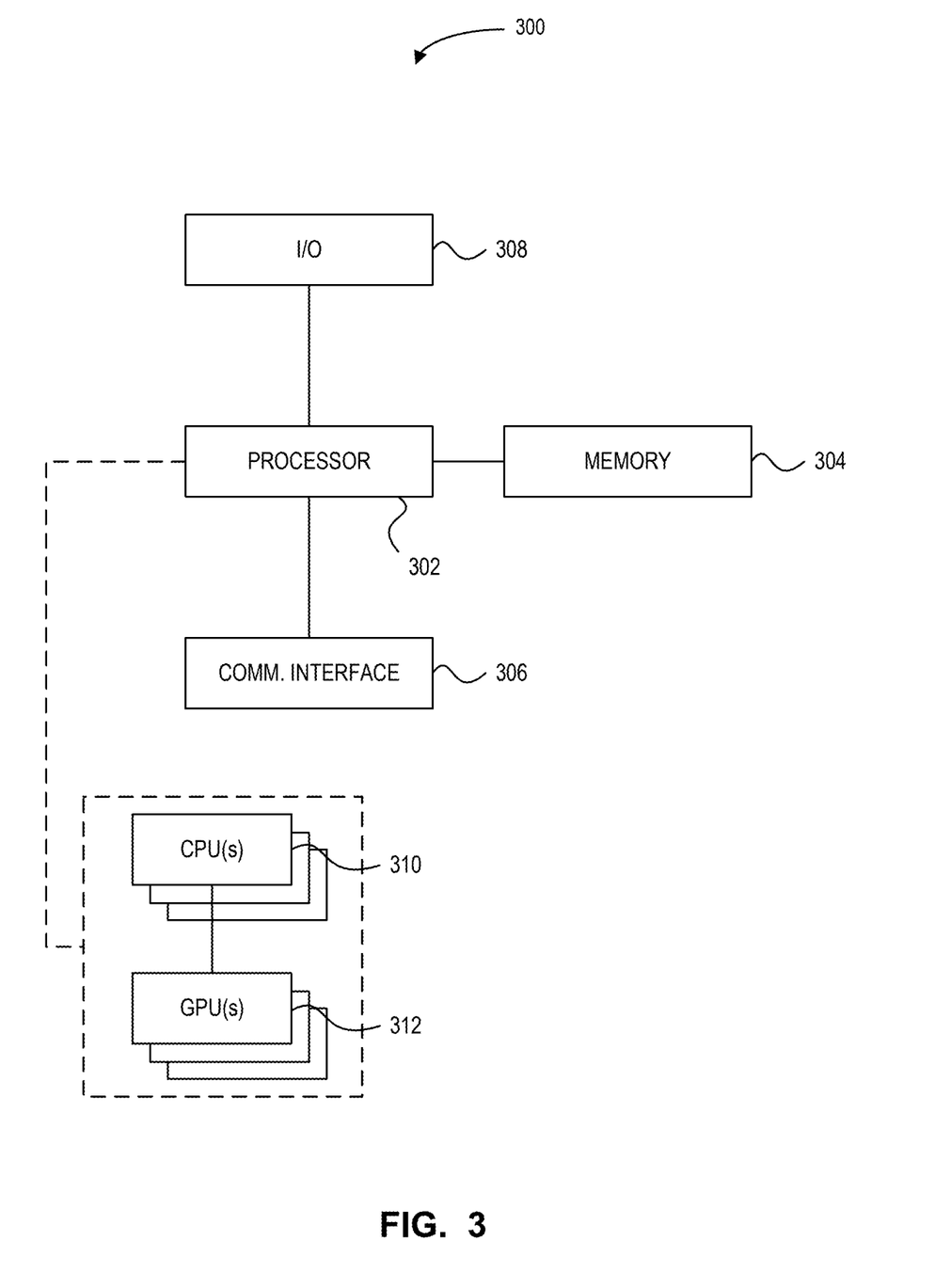
FIG. 3 is a block diagram of an example computer.

The second pipeline 212 may be implemented by one or more computers, such as, but not limited to, the computer described with respect to FIG. 3. The second pipeline 212 may comprise a retriever module 228, a prompt generator module 230, and a query expansion module 232.

The retriever module 228 is configured to select one or more of the synthetic queries generated by the first pipeline 206 (e.g., one or more of the synthetic queries in the synthetic query data store 210) related to the query 226 and retrieve the selected synthetic queries from the synthetic query data store 210. A synthetic query may be deemed to be related to a query if the synthetic query is similar to the query.

In some cases, the retriever module 228 may be configured to assign a similarity score to each synthetic query that represents the similarity between the synthetic query and the query 226, and the retriever module 228 may be configured to select the one or more synthetic queries based on the similarity scores. The retriever module 228 may be configured to generate the similarity scores in any suitable manner. For example, in some cases, the retriever module 228 may be configured to: compute, for each synthetic query generated by the first pipeline 206 (e.g., the synthetic queries in the synthetic query data store 210), into a text embedding (which may also be referred to as a vector or simply an embedding), using an embedding model; compute a text embedding for the received query 226; compare the text embedding for the query 226 to the text embeddings for the synthetic queries to determine similarity scores therefor. In some cases, the embeddings may be stored in vector database (not shown). In other cases, the embeddings may be stored in a graph database, either in alternative or in addition to the vector database. In some cases, the retriever module 228 may comprise a scoring module (not shown) that is configured to generate the similarity scores. In other cases, the scoring module may be separate from the retriever module 228.

When the retriever module 228 (or another module such as an external scorer module) is configured to generate similarity scores for the synthetic queries that represent the similarity between the synthetic queries and the received query 226, the retriever module 228 may be configured to select the k most similar synthetic queries to the received query 226 based on the similarity scores. For example, the retriever module 228 may be configured to select the k synthetic queries with the highest similarity scores. In some cases, k may be a fixed integer greater than or equal to one. In other cases, the retriever module 228 may be configured to select all of the synthetic queries that have a similarity score that exceeds a predetermined threshold. The latter implementation allows queries with many similar queries to use more relevant examples, and similarly allows queries that are not similar to any of the synthetic queries to not use irrelevant examples. As described in more detail below, not selecting irrelevant synthetic queries would avoid having irrelevant information added to the adaptive few-shot prompt which may render the amended query generated by the query expansion module 232 less useful in identifying relevant information than the original query.

The prompt generator module 230 is configured to instruct the LLM 208 to generate a response to the query 226 in accordance with example query-response pairs based on the selected synthetic queries (i.e., the synthetic queries identified by the retriever module 228 as being related to the query 226). The prompt generator module 230 may be configured to instruct the LLM 208 to generate a response to the query 226 based on the example query-response pairs using few-shot prompting techniques. Specifically, the prompt generator module 230 may be configured to dynamically generate an adaptive few-shot prompt to instruct the LLM 208 to generate a response to the query 226, wherein the few-shot prompt comprises or includes an example query-response pair for each of the selected one or more synthetic queries and then provide the generated few-shot prompt to the LLM 208 to generate an output. Each query-response pair comprises one of the selected synthetic queries and the related or corresponding document, a portion (e.g., chunk) of the related or corresponding document, or the LLM 208 generated response to the synthetic query initiated by the quality filtering module 222. The adaptive few-shot prompt is "adaptive" because it contains information that is specific, or tailored, to the query that the few-shot prompt relates to. This is contrast to other query expansion methods that are known to the Applicant wherein the examples in a prompt are static or the same for each query. An example adaptive few-shot prompt wherein each query-response pair is based on a synthetic query and the related document or portion (e.g., chunk) of the related document is shown below.

You are given some related queries and their supporting documents as examples. Your task is to generate the corresponding document in response to a given query.
Query 1: {[Synthetic Query]}
Document: {{Document 1}} . . .
Query k: {{Synthetic Query}}
Document k: {{Document k}}
Now it is your turn.
Query: {{Query}}
Document:

An example adaptive few-shot prompt based on the LLM 208 wherein each query-response pair is based on a synthetic query and the LLM generated response to the synthetic query (which may be referred to herein as the corresponding synthetic response) is shown below.

You are intelligent assistance. You are given some related queries and their supporting document and your task is to generate a response to a query.

Query 1: {[Synthetic Query 1]}
Document: {{Synthetic Response 1}}
Query k: {{Synthetic Query k}}
Document k: {{Synthetic Response k}}
Now it is your turn. Please try to be informative and concise. Please provide the response for the query.
Query: {{Query}}
Response:

The example few-shot prompts induce the LLM 208 to generate a response to the query 226 in a manner that allows the LLM to refence existing documents or responses that are part of the few-shot prompt. The response may be in the form of a pseudo-document.

The query expansion module 232 is configured to receive the output (e.g., response or pseudo-document) of the LLM 208 in response to the instructions (e.g., adaptive few-shot prompt) generated by the prompt generator module 230 and generate an amended query 240 based thereon. The query expansion module 232 may be configured to generate the amended query 240 based on the output of the LLM 208 in response to the adaptive few-shot prompt in any suitable manner. In some cases, the query expansion module 232 may be configured to generate the amended query 240 by replacing the query with the output (e.g., response or pseudo-document) generated by the LLM 208. In other cases, the query expansion module 232 by be configured to generate the amended query 240 by combining the query 226 and the output (e.g., response or pseudo-document) of the LLM 208 in response to the adaptive few-shot prompt. For example, the query expansion module 232 may be configured to concatenate the query 226 and the output of the LLM. In some cases, the amended query 240 may be provided to the user interface 214.

The amended query 240 generated by the query expansion module 232 may subsequently be used in an IR system, such as a zero-shot IR system, to perform an IR task on the set of documents 216. The IR task may be a sparse IR task or a dense IR task.

It will be appreciated that, while the components shown in FIG. 2 for the cloud-based computing cluster 130 can be implemented with the system 100 in FIG. 1, in some other cases, the components shown in FIG. 2 are instead implemented in an isolated computing system. In other words, the components shown in FIG. 2 can be implemented as a computing system without the EDPP 120 and the source database system 110.

Reference is now made to FIG. 3 which illustrates a simplified block diagram of an example computer 300. Computer 300 is an example implementation of a computer which may implement database system 110, EDPP 120, and/or one or more components of the cloud-based computing cluster 130 of FIGS. 1 and 2. Computer 300 has at least one processor 302 operatively coupled to at least one memory 304, at least one communications interface 306 (also referred to herein as a network interface), and at least one input/output (I/O) device 308.

The at least one memory 304 includes a volatile memory that stores instructions executed or executable by the processor 302, and input and output data used or generated during execution of the instructions. The memory 304 may also include non-volatile memory used to store input and/or output data—e.g., within a database-along with program code containing executable instructions.

The processor 302 may transmit or receive data via the communications interface 306 and may also transmit or receive data via any additional input/output device 308 as appropriate.

In some cases, the processor 302 includes a system of central processing units (CPUs) 310. In other cases, the processor 302 includes a system of one or more CPUs 310 and one or more Graphical Processing Units (GPUs) 312 that are coupled together. For example, the LLM 208 may execute neural network computations on CPU and GPU hardware, such as the system of CPUs 310 and GPUs 312 of FIG. 3.

Figure 4:
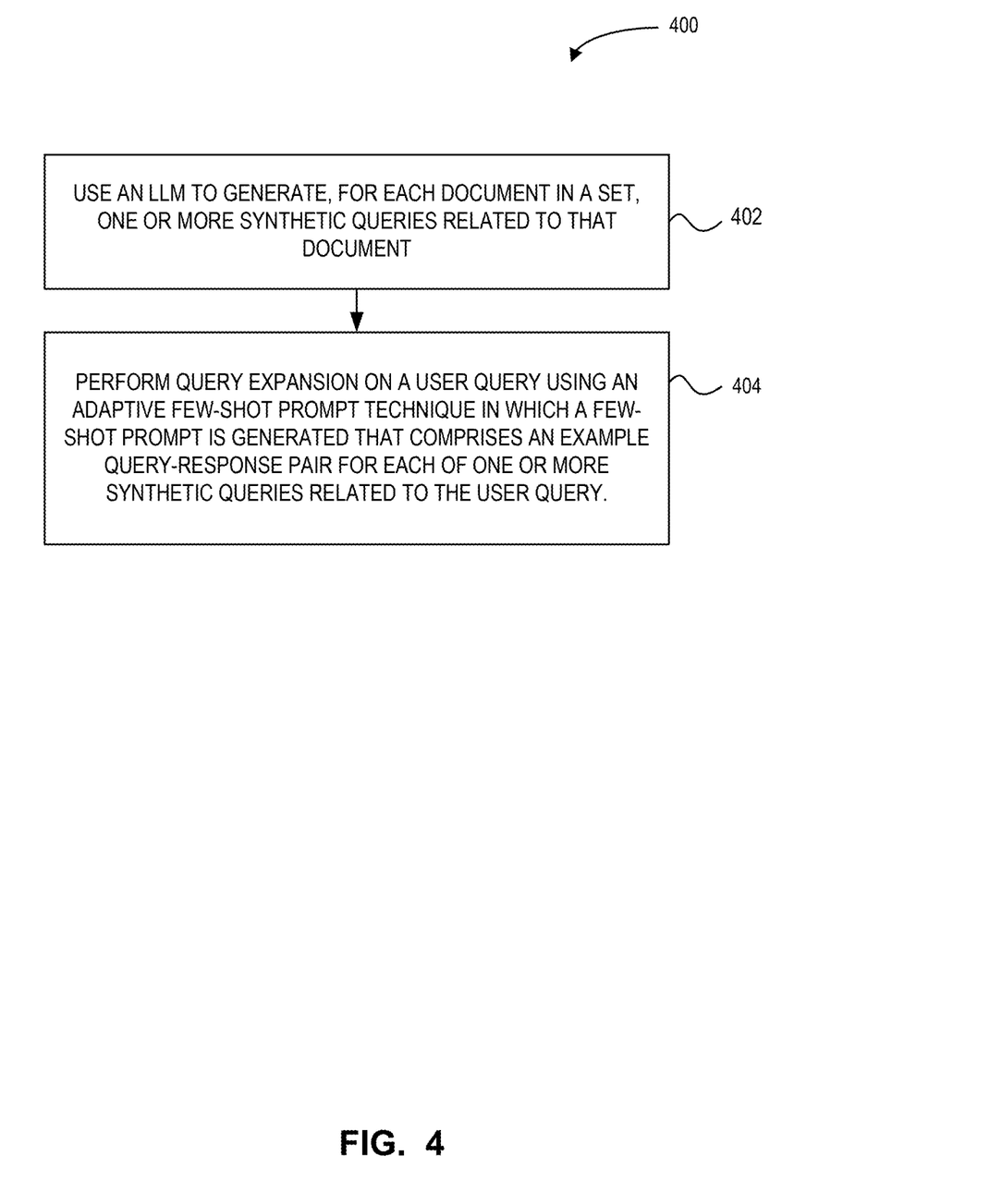
FIG. 4 is flow diagram of an example method of performing query expansion.

Reference is now made to FIG. 4 which illustrates an example method 400 for performing query expansion which may be implemented by the cloud-based computing cluster 130 of FIG. 2 or another computing system. The method 400 begins at block 402 where the computing system (e.g., the first pipeline 206 of FIG. 2) uses an LLM to generate, for each document of a set of documents, one or more synthetic queries related to the document. The synthetic queries for the set of documents may be generated by the LLM in any suitable manner. For example, as described above, in some cases, the LLM may be instructed to generate a query for each document or each portion of each document in accordance with one or more example document-query pairs. An example method of generating the synthetic queries is described below with respect to FIG. 5. Once the synthetic queries for the set of documents have been generated, the method 400 proceeds to block 404 where the computing system (e.g., the second pipeline 212 of FIG. 2) performs query expansion on a received user query using an adaptive few-shot prompt technique in which a few-shot prompt is generated that comprises an example query-response pair for each of one or more synthetic queries selected or identified as being related to the user query. An example method of performing the expansion query of block 404 is described below with respect to FIG. 6. Block 404 may be repeated for each user query received.

Figure 5:
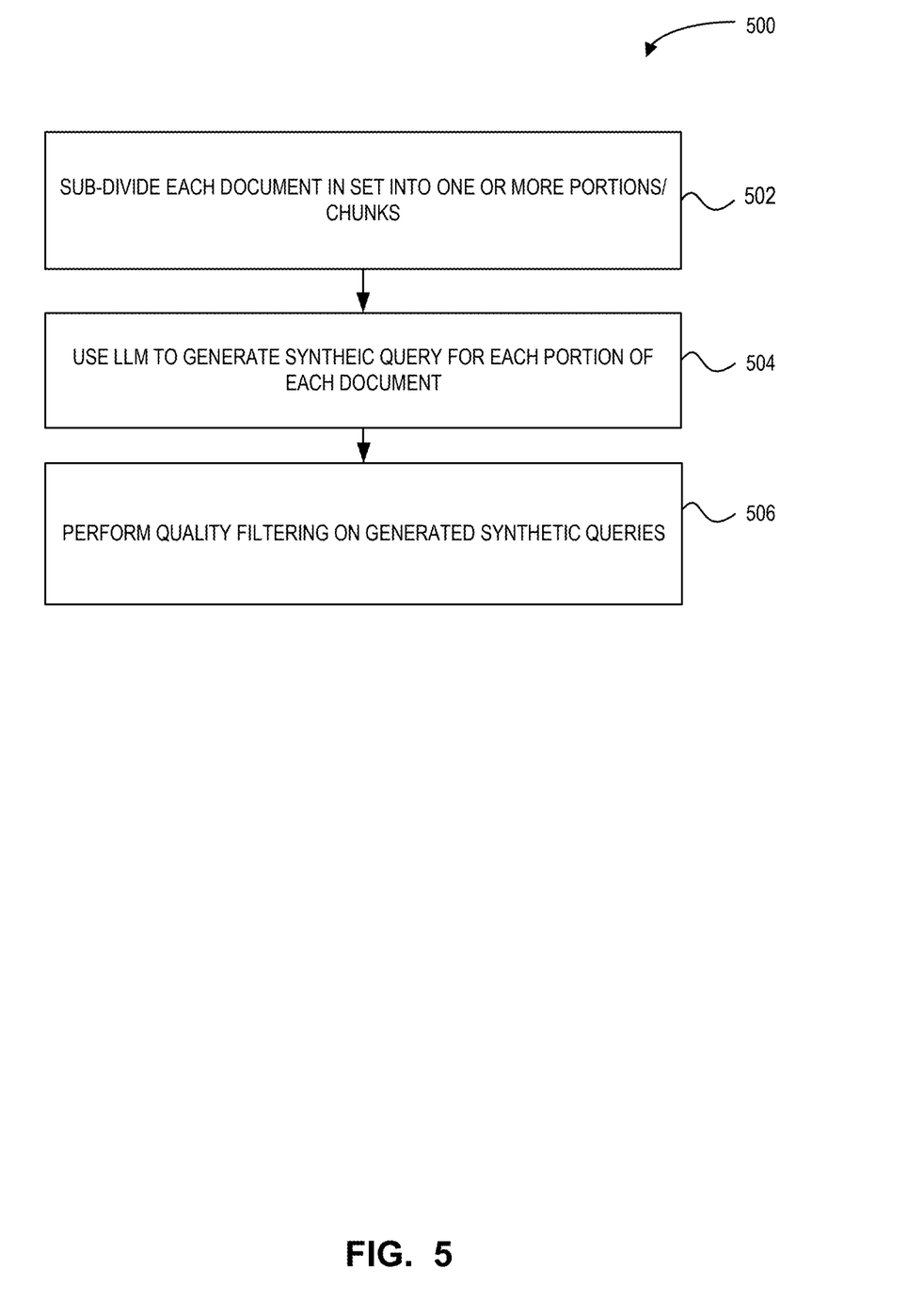
FIG. 5 is a flow diagram of an example method of using an LLM to generate synthetic queries related to a set of documents.

Reference is now made to FIG. 5 which illustrates an example method 500 of using an LLM to generate synthetic queries related to a set of documents. The method 500 of FIG. 5 may be used to implement block 402 of the method 400 of FIG. 4. The method 500 begins at block 502 where each document of the set of documents is sub-divided into one or more portions (which may also be referred to as chunks) of text. A document may be divided into portions of text using any suitable method such as, but not limited to, the chunking methods described above with respect to FIG. 2. Once the documents in the set have been sub-divided into portions or chunks, the method 500 proceeds to block 504.

At block 504, an LLM is used to generate a synthetic query related to each portion of each document. In some cases, using the LLM to generate a synthetic query for a portion of a document may comprise providing a query shot prompt to the LLM that instructs the LLM to generate a synthetic query that is answered by the portion of the document, wherein the query few-shot prompt comprises a plurality of example document-query pairs. As described above, the example document-query pairs are selected so as to provide examples of desired formats and styles for the queries. An example query few-shot prompt was provided above. The generated synthetic queries may be stored in a synthetic query data store for use in query expansion. Once the synthetic queries have been generated, the method proceeds to block 506.

At block 506, quality filtering is performed on the synthetic queries generated in block 504. This may comprise, determining whether each synthetic query generated in block 504 satisfies a quality requirement. A synthetic query that does not satisfy the quality requirement may then be discarded (e.g., the synthetic query may not be stored in the synthetic query data store). In some cases, determining whether a synthetic query satisfies a quality requirement may comprise using an LLM to determine whether the synthetic query is relevant to the related document. Using an LLM to determine whether a synthetic query satisfies a quality requirement may comprise providing the LLM with a relevance few-shot prompt that instructs the LLM to determine whether the synthetic query is relevant to the document, wherein the relevance few-shot prompt comprises one or more examples, each example comprising an example query, an example document or example portion of a document, and an indication of whether the example query is relevant to the example document or example portion of a document. An example relevance few-shot prompt was provided above. In other cases, determining whether a synthetic query satisfies a quality requirement may comprise instructing an LLM to generate a response to the synthetic query from the related document and determining that the synthetic query does not satisfy the quality requirement if the LLM is unable to generate a response to the synthetic query from the related document. In these cases, where it is determined that a synthetic query satisfies the quality requirement, the generated response (e.g., the synthetic response) may be stored in the synthetic query data store along with the synthetic query. Once the quality filtering has been performed on the generated synthetic queries, the method 500 may end.

The method 500 of FIG. 5 is only an example method of generating synthetic queries related to a set of documents and that in other examples not all of the blocks of the method 500 of FIG. 5 may be implemented. For example, in other methods one or more of blocks 502 and 506 may not be implemented. In other words, blocks 502 and 506 are optional. If block 502 is not implemented then instead of using the LLM to generate a query for each portion of each document, the LLM may be used to generate one or more queries for each document as a whole.

Figure 6:
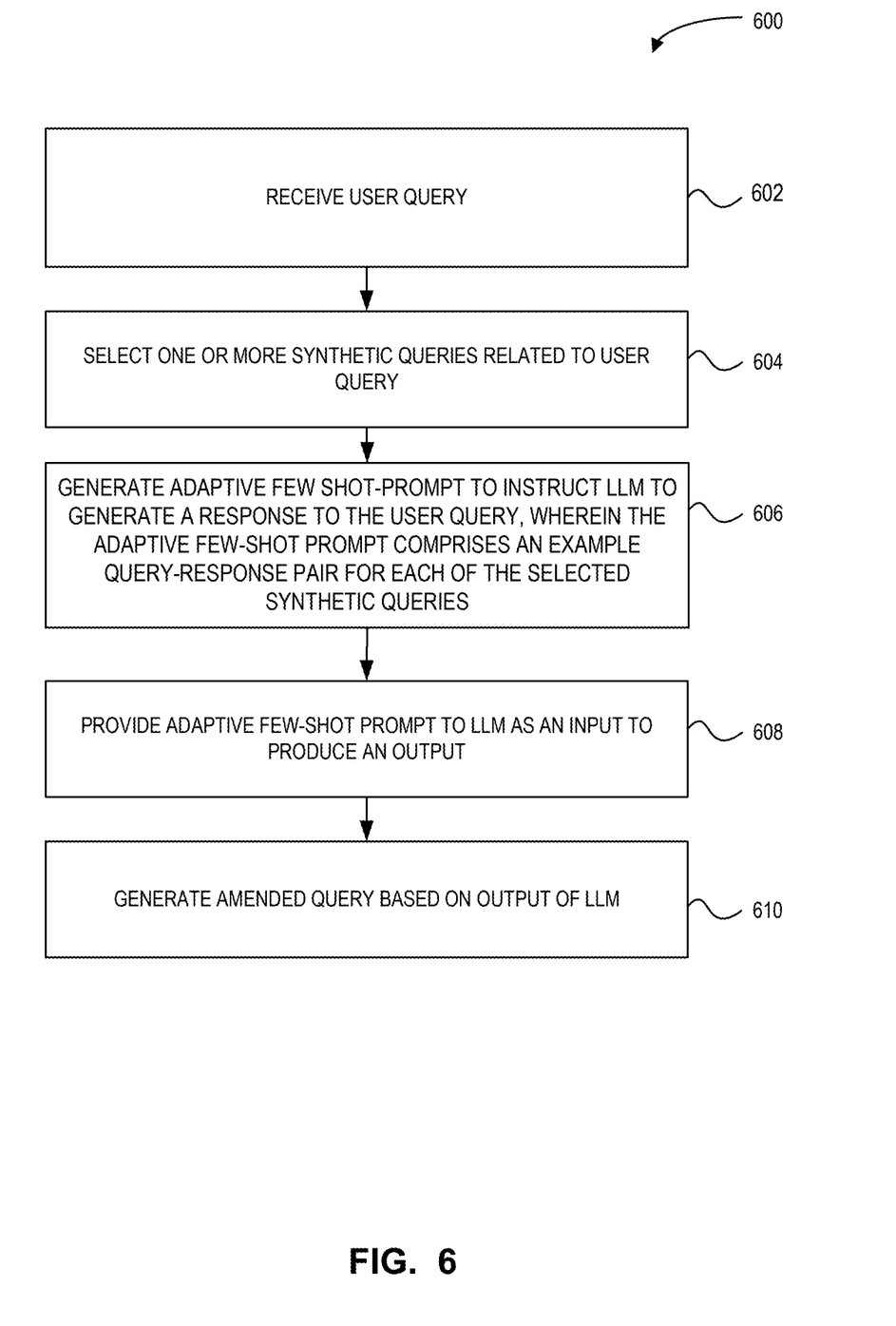
FIG. 6 is a flow diagram of an example method of using a few-shot prompting technique that uses synthetic queries related to a query to perform query expansion.

Reference is now made to FIG. 6 which illustrates an example method 600 for performing query expansion on a received user query using an adaptive few-shot prompt technique in which a few-shot prompt is generated that comprises an example query-response pair for each of one or more synthetic queries selected or identified as being related to the user query. The method 600 of FIG. 6 may be used to implement block 404 of the method 400 of FIG. 4. The method 600 begins at block 602 where a user query is received (e.g., via a user interface). Once the user query has been received the method 600 proceeds to block 604.

At block 604, one or more of the synthetic queries generated in block 402 that are related to the received user query are selected. In some cases, selecting the synthetic queries that are related to the received user query comprises assigning a similarity score to each synthetic query that represents the similarity between the synthetic query and the user query and selecting one or more synthetic queries based on the similarity scores. The similarity scores may be generated in any suitable manner. For example, as described above, an embedding may be generated for each synthetic query using an embeddings LLM, an embedding may be generated for the user query using the embeddings LLM, and a similarity score may be generated for a synthetic query by comparing the embedding for the synthetic query and the embedding for the user query. In some cases, the k most similar synthetic queries according to the similarity scores may be selected, wherein k is a fixed integer greater than or equal to one. In other cases, each synthetic query with a similarity score above a predetermined threshold may be selected. Once one or more synthetic queries that are related to the user query have been selected, the method 600 proceeds to block 606.

At block 606, an adaptive few shot-prompt is generated to instruct an LLM to generate a response to the user query, wherein the adaptive few-shot prompt comprises an example query-response pair for each of the related synthetic queries selected in block 504. In this manner the adaptive few-shot prompt comprises example query-response pairs that are specific to or tailored to the received user query. In some cases, the query-response pair for a synthetic query comprises the synthetic query and the related document. In other cases, the query-response pair for a synthetic query comprises the synthetic query and a synthetic response to that query generated by an LLM. Example adaptive few-shot prompts which may be generated in block 606 were provided above. Once the adaptive few-shot prompt has been generated, the method 600 proceeds to block 608.

At block 608, the adaptive few-shot prompt generated in block 606 is provided to, or input to, the LLM which causes the LLM to generate an output (i.e., a response to the query). Once the adaptive few-shot prompt generated in block 606 has been provided to the LLM, the method 600 proceeds to block 610.

At block 610, the output of the LLM (i.e., response to the query) in response to the adaptive few-shot prompt generated in block 606 is used to generate an amended query. The amended query may be generated from the output of the LLM in any suitable manner. In some cases, the amended query may be generated by replacing the user query with the output of the LLM (i.e., the generated response to the query). In other cases, the amended query may be generated by combining the user query and the output of the LLM. For example, the amended query may be generated by concatenating the original user query with the output of the LLM. Once the amended query has been generated the method 600 ends.

In some cases, where the amended queries generated by the systems and/or methods described herein are used for information retrieval tasks in an IR system with an embedding model and/or a reranker model, the generated synthetic queries and their related document (or related portion of a document) may be used to fine-tune or refine the embedding model and/or the reranker model. For example, in some cases, the embedding model and/or reranker model may be re-trained, using a known training method, for a small number of epochs using the synthetic query-document (or portion of a document) pairs.

In some cases, where the amended queries generated by the systems and/or methods described herein are used for information retrieval task in an IR system with an embedding model and/or a reranker model the embedding model or the reranker model may be trained using a training set that takes into account amended queries that may be generated in accordance with the methods and systems described herein. Specifically, an augmented training set for training the embedding model and/or the reranker model may be generated by performing query expansion on each of the generated synthetic queries using a plurality of different query expansion methods to generate a plurality of amended synthetic queries for each synthetic query. The plurality of query expansion method which may be used to generate the amended synthetic queries include, but are not limited, a query expansion method in which keywords related to the query are added thereto, a query expansion method in which a response generated by an LLM in response the query is added thereto, and/or the adaptive query expansion method described herein wherein synthetic queries related to the query are added to the prompt used to instruct the LLM and the output of the LLM in response to the prompt is added to the query In some cases, both the re-tuning and training using the generated synthetic queries may be implemented.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g., 112a, or 112b). All elements with a common base number may be referred to collectively or generically using the base number without a suffix (e.g., 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g., a pushbutton keyboard, mouse, a touch-screen, and the like), and at least one output device (e.g. a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A system for performing query expansion, the system comprising:
   a memory, a communication interface, and a processor operatively coupled to the memory and the communication interface;
   the processor configured to:
      for each document of a set of documents, use a large language model (LLM) to generate one or more synthetic queries related to the document;
      select one or more synthetic queries related to a query;
      dynamically generate an adaptive few-shot prompt to instruct the LLM to generate a response to the query, wherein the adaptive few-shot prompt comprises an example query-response pair for each of the selected one more synthetic queries;
      provide the adaptive few-shot prompt to the LLM;
      generate an amended query based on an output of the LLM in response to the adaptive few-shot prompt;
      perform an information retrieval task on the set of documents based on the amended query using a zero-shot information retrieval system;
      perform query expansion on the synthetic queries using a plurality of different query expansion methods to generate a plurality of amended synthetic queries for each synthetic query;
      augment a training set used to train the zero-shot information retrieval system based on the amended synthetic queries; and
      prior to performing a further information retrieval task, train the zero-shot information retrieval system using the augmented training set.

2. The system of claim 1, wherein using the LLM to generate the one or more synthetic queries comprises providing a query few-shot prompt to the LLM that instructs the LLM to generate a synthetic query that is answered by the document, wherein the query few-shot prompt comprises a plurality of example document-query pairs.

3. The system of claim 1, wherein using the LLM to generate the one or more synthetic queries comprises dividing the document into one or more chunks corresponding to portions of text and instructing the LLM to generate a synthetic query for each of the one or more chunks.

4. The system of claim 1, wherein the processor is further configured to, prior to selecting the one or more synthetic queries related to the query, discard any synthetic query that does not satisfy a quality requirement.

5. The system of claim 4, wherein the processor is further configured to, for each synthetic query, determine whether the synthetic query satisfies the quality requirement by using the LLM to determine whether the synthetic query is relevant to the related document.

6. The system of claim 5, wherein using the LLM to determine whether the synthetic query is relevant to the related document comprises providing the LLM with a relevance few-shot prompt that instructs the LLM to determine whether the synthetic query is relevant to the document, wherein the relevance few-shot prompt comprises one or more examples, each example comprising an example query, an example document or an example portion of a document, and an indication of whether the example query is relevant to the example document or the example portion of the document.

7. The system of claim 4, wherein the processor is further configured to, for each synthetic query, instruct the LLM to generate a response to the synthetic query from the related document, and determine that the synthetic query does not satisfy the quality requirement if the LLM is unable to generate the response to the synthetic query from the related document.

8. The system of claim 7, wherein the example query-response pair for a synthetic query comprises the synthetic query and the response to the synthetic query generated by the LLM from the related document.

9. The system of claim 1, wherein the processor is further configured to store the synthetic queries in a synthetic query data store in the memory.

10. The system of claim 1, wherein the processor is further configured to assign a similarity score to each synthetic query that represents a similarity between the synthetic query and the query, and the one or more synthetic queries related to the query are selected based on the respective similarity scores.

11. The system of claim 10, wherein the similarity score is based on embeddings generated from an embedding model.

12. The system of claim 10, wherein the selected one or more synthetic queries related to the query comprises k most similar synthetic queries to the query based on the respective similarity scores, wherein k is an integer greater than or equal to one.

13. The system of claim 10, wherein the selected one or more synthetic queries related to the query comprises each synthetic query that has a similarity score that exceeds a predetermined threshold.

14. The system of claim 1, wherein the output of the LLM in response to the adaptive few-shot prompt is a pseudo document.

15. The system of claim 1, wherein generating an amended query based on the output of the LLM in response to the adaptive few-shot prompt comprises combining the query and the output of the LLM in response to the adaptive few-shot prompt to form the amended query.

16. The system of claim 1, wherein the zero-shot information retrieval system comprises an embedded model and/or a reranker model, and the processor is further configured to, prior to performing the information retrieval task, tune the embedded model and/or the reranker model using the synthetic queries and their related documents.

17. A method for performing query expansion, the method executed in a computing environment comprising one or more processors, a communication interface, and memory, and the method comprising:
  for each document of a set of documents, causing a large language model (LLM) to generate one or more synthetic queries related to the document;
  selecting one or more synthetic queries related to a query;
  dynamically generating an adaptive few-shot prompt to instruct the LLM to generate a response to the query, wherein the adaptive few-shot prompt comprises an example query-response pair for each of the selected one more synthetic queries;
  providing the adaptive few-shot prompt to the LLM;
  generating an amended query based on an output of the LLM in response to the adaptive few-shot prompt;
  performing an information retrieval task on the set of documents based on the amended query using a zero-shot information retrieval system;
  performing query expansion on the synthetic queries using a plurality of different query expansion methods to generate a plurality of amended synthetic queries for each synthetic query;
  augmenting a training set used to train the zero-shot information retrieval system based on the amended synthetic queries; and
  prior to performing a further information retrieval task, training the zero-shot information retrieval system using the augmented training set.

18. A non-transitory computer readable medium storing computer executable instructions which, when executed by at least one computer processor, cause the at least one computer processor to carry out a method for performing query expansion, the method comprising:
  for each document of a set of documents, instructing a large language model (LLM) to generate one or more synthetic queries related to the document;
  selecting one or more synthetic queries related to a query;
  dynamically generating an adaptive few-shot prompt to instruct the LLM to generate a response to the query, wherein the adaptive few-shot prompt comprises an example query-response pair for each of the selected one more synthetic queries;
  providing the adaptive few-shot prompt to the LLM;
  generating an amended query based on an output of the LLM in response to the adaptive few-shot prompt;
  performing an information retrieval task on the set of documents based on the amended query using a zero-shot information retrieval system;
  performing query expansion on the synthetic queries using a plurality of different query expansion methods to generate a plurality of amended synthetic queries for each synthetic query;
  augmenting a training set used to train the zero-shot information retrieval system based on the amended synthetic queries; and
  prior to performing a further information retrieval task, training the zero-shot information retrieval system using the augmented training set.

\* \* \* \* \*